May 29, 1934.    F. W. JACKMAN    1,960,632
MOUNTING FOR A FLEXIBLE TRANSLUCENT MOTION PICTURE SCREEN
Filed Oct. 11, 1932
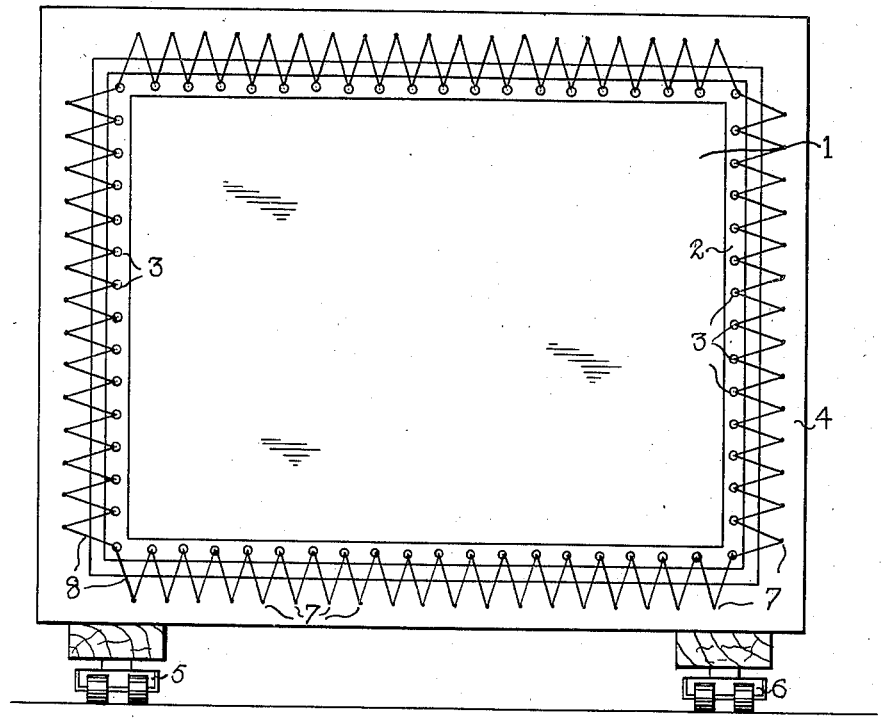
INVENTOR:
FRED W. JACKMAN
BY
ATTORNEY.

Patented May 29, 1934

1,960,632

UNITED STATES PATENT OFFICE 1,960,632

MOUNTING FOR A FLEXIBLE TRANSLUCENT MOTION PICTURE SCREEN

Fred W. Jackman, Beverly Hills, Calif., assignor to Warner Bros. Pictures, Inc., New York, N. Y., a corporation of Delaware Application October 11, 1932, Serial No. 637,292

1 Claim. (Cl. 88—24)

This invention relates to a flexible translucent motion picture screen and more particularly to apparatus and method for mounting the same.

It has heretofore been proposed to employ a heavy glass screen having a ground surface on which a picture or motion pictures are to be projected, rigidly mounted in a supporting frame. A large glass screen of this type has several disadvantages in that it is very heavy, dangerous and difficult to move.

An object of the present invention is to avoid the danger, weight and inconvenience of a rigidly mounted fragile translucent screen.

This is accomplished by providing a flexible translucent screen which is supported in an upright position, free from wrinkles by a self-compensating resilient mounting.

For further details of this invention, reference may be made to the accompanying drawing which shows a flexible translucent screen resiliently mounted in a movable supporting frame.

A screen suitable for the projection of motion pictures which are to be viewed or photographed from the opposite side thereof, must be light in weight and flexible, so that it may be easily moved. Such a screen as this, is disclosed in my co-pending application, S. N. 631,964 filed September 7, 1932. Therein is disclosed a cellulose acetate screen, in the preparation of which a solution of cellulose acetate is sprayed under gravitational pressure onto an uneven or roughened flat surface such as a large sheet of ground glass. A multiple coating of the solution is applied to the surface, and onto a border of canvas, each coating being permitted to dry. After the final coating has dried, a unitary sheet of flexible translucent material with its border may be stripped from the base on which it was formed, thereby forming a non-fragile translucent screen which may be manufactured economically of any desired size.

In order to provide a convenient arrangement for supporting the large sheet of cellulose acetate, so made, substantially in a plane without wrinkles, a flexible translucent motion picture screen 1 has integrally united with its edge a border of canvas 2, in which there are a series of eye-lets 3 for attachment to a frame 4. Frame 4 is supported for mobility by means of suitable rollers 5 and 6. The frame 4 may be of any suitable material, preferably wood, and of any convenient size to accommodate the screen 1. A series of pins or fastening members 7 are placed along the edges of the frame 4 and are resiliently connected by means of helical springs, rubber bands, or any other suitable elastic members 8 to the corresponding series of eye-lets 3 in the border 2.

By using this form of mounting, the screen will always remain taut without any wrinkles therein, and the assembly constitutes a light mobile unit that may be quickly and safely moved from place to place without any danger to workmen.

Having thus described my invention what I claim as new and desire to secure by Letters Patent is:

In combination, a flexible translucent motion picture projection screen of cellulose material, a reinforcing edge for said screen having a series of apertures therein, means comprising some of said cellulose material for integrally uniting said reinforcing edge with said screen, a supporting frame, a series of fastening members on said frame, and elastic means for interconnecting said apertures and said fastening members.

FRED W. JACKMAN.